Figure 1:
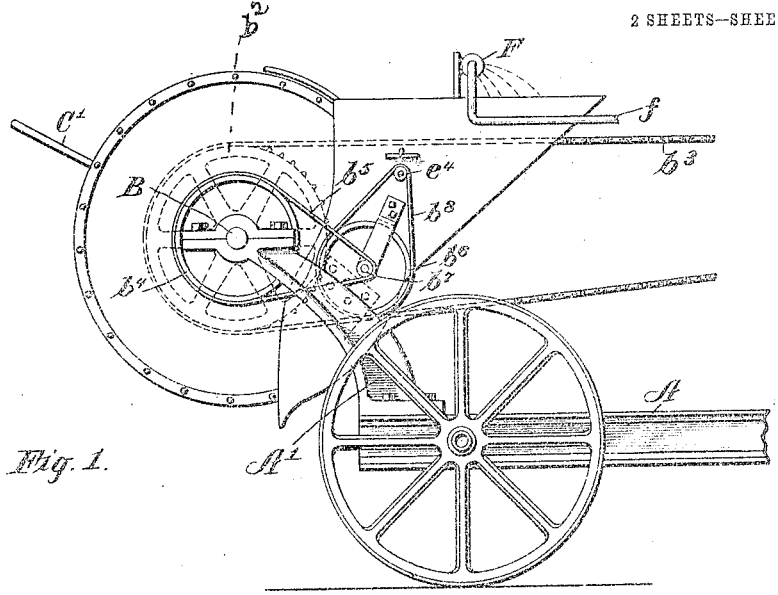

No. 808,836. PATENTED JAN. 2, 1906.
P. C. HAINS.
METHOD OF MIXING CONCRETE.
APPLICATION FILED APR. 11, 1905.

2 SHEETS—SHEET 1

Witnesses: Inventor:
Peter C. Hains,
by
Attorney

No. 808,836. PATENTED JAN. 2, 1906.
P. C. HAINS.
METHOD OF MIXING CONCRETE.
APPLICATION FILED APR. 11, 1905.

2 SHEETS—SHEET 2.

Witnesses:

Inventor
Peter C. Hains,
By
Attorney

UNITED STATES PATENT OFFICE.

PETER C. HAINS, OF WASHINGTON, DISTRICT OF COLUMBIA.

METHOD OF MIXING CONCRETE.

No. 808,836.   Specification of Letters Patent.   Patented Jan. 2, 1906.

Application filed April 11, 1905. Serial No. 254,910.

*To all whom it may concern:*

Be it known that I, PETER C. HAINS, a citizen of the United States, residing at Washington, in the District of Columbia, have invented certain new and useful Improvements in Methods of Mixing Concrete, of which the following is a specification.

The invention to be hereinafter described relates to the method of mixing concrete whereby the several ingredients employed to form the mixture are brought into intimate relation in proper economical proportions to form the desired product.

Concrete, as well understood, consists of an intimate mixture of an active cementing substance and particles of inert material, which upon hardening of the cementing substance forms an artificial stone, the active cementing substance consisting usually of hydraulic cement and water forming a paste, and the inert material consisting of sand combined with broken stone or gravel, or both. To secure the best results and produce concrete of a homogeneous character, it is desirable that each particle of the inert material shall be covered with the cement paste, the smaller particles serving to fill the interstices between the larger particles and the cement paste filling the remaining voids. Cement paste in excess of the amount required to properly cover the particles of the inert material may be considered largely as waste, only that portion of the excess actually filling voids serving its proper and economic purpose.

The methods heretofore employed in mixing concrete have been open to the objection that they did not impart the desired covering of cement paste to all the particles of the inert material, and especially has this been the case where an excess of cement has not been employed. The cement constituent of the mixture is by far the most costly, and since an excess over the amount necessary to properly cover all the particles of inert material is largely without substantial value or may be regarded as waste it will at once be apparent that an economic production of concrete requires that due consideration be given the proper distribution of the cement throughout the mass during the mixing operation. By the methods heretofore employed the sand, broken stone, or other character of inert material, water, and cement were brought together in a mass and then agitated either by hand or machine manipulation to cause a distribution of the cement and the intimate mixture of all the constituents; but in such cases all the particles of inert material were not covered by the cement paste, thus producing concrete more or less defective, according to the degree of cement distribution, or an excess of cement was employed with a consequent loss of economic production. In either event, however, it was necessary to carry on the agitation of the mass for a prolonged period to insure a reasonable incorporation of the cement with the inert material.

With these and other defects in view the object of the present invention is to provide a method of mixing the active and inert substances, whereby the active substance or cement is evenly and intimately brought into surface contact with every particle of the inert substance while the latter is in a wet condition, so that every particle of the inert material is properly covered with cement paste and the use of an excess of cement is avoided, so that upon hardening the entire mixture will be properly bound together into a homogeneous mass.

Generally stated, the present invention consists of forming a cloud of dry cement powder, wetting the inert material, and passing the inert material while wet into contact with the cloud of cement powder, whereby the particles of cement powder contact with and adhere to the wet surfaces of the particles of inert material, providing a covering therefor of cement paste, all as will be hereinafter more fully described and then definitely pointed out in the claims.

Figure 2:
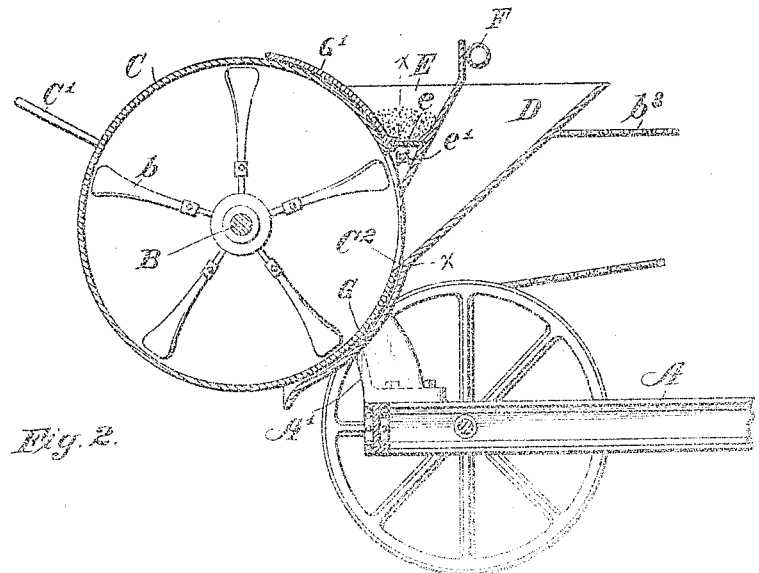
Figure 3:
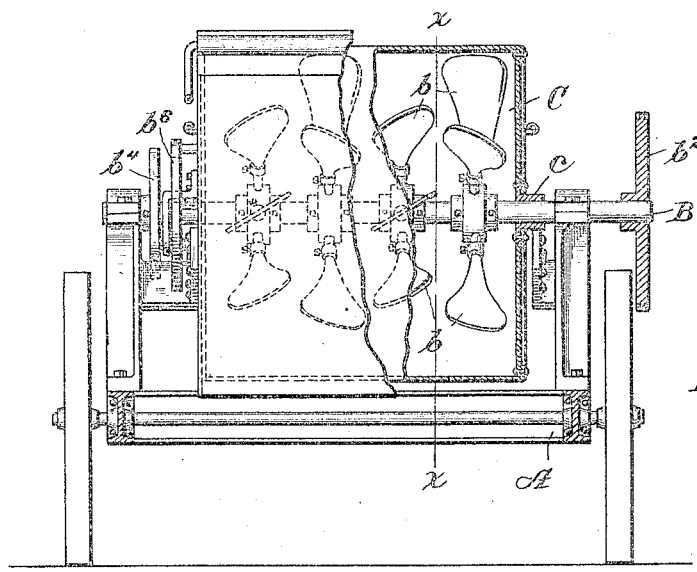
Figure 4:
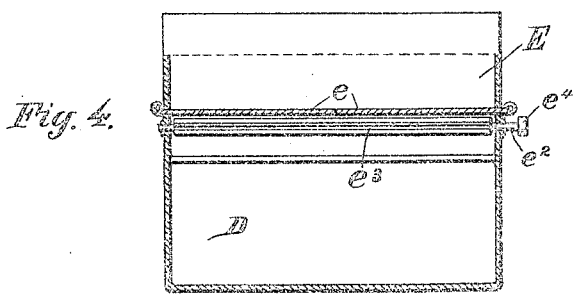

In the accompanying drawings, which illustrate one of the many forms of mechanical devices by which the present method may be carried into practical effect, Figure 1 represents in side elevation a portion of a truck or other form of wheeled structure having provisions for carrying out the present method. Fig. 2 is a central vertical longitudinal section on line x x, Fig. 3. Fig. 3 is an end view of Fig. 1 looking in the direction of the arrow and with portions broken away to show parts beyond. Fig. 4 is a section on line x x of Fig. 2.

In the drawings, A represents any usual form of wheeled truck adapted to carry the mixing instrumentalities to be described. A wheeled truck or carriage is preferably employed as a matter of convenience, so that it may be moved from place to place, according to the calls of the work and as may be desired; but it will be understood, of course, that this is not necessary, and a fixed structure might be employed as the supporting-frame.

Projecting upward from the truck A are the brackets A′, carrying at their upper ends suitable bearings for the shaft B, extending transversely of the truck A. Upon the shaft B are mounted a series of stirrers or blades $b$, Figs. 2 to 3, which are preferably housed within a casing C, also mounted at $c$ upon the shaft B, said casing being normally held stationary, but capable of being turned upon its bearings $c$ upon the shaft B by means of a handle C′ when desired. Likewise secured to the truck A by means of the brackets A′ is a receptacle D of any suitable size and shape for conveniently holding the inert material, said receptacle in the present embodiment of the structure being disclosed as a chute having an open lower end. Adjacent to the receptacle D and preferably above the same is a cement-receptacle E, the lower end of which may be closed by a pair of sliding doors $e\ e$, and preferably disposed lengthwise of the cement-receptacle is the cement-agitator $e'$, the purpose of which is to engage the cement as it comes from the cement-receptacle E and form it into a cloud or floating mass of fine particles, which is easily accomplished, since the cement powder is dry and in a pulverulent condition. The cement-agitator $e'$ comprise in the form illustrated a shaft $e^2$, having the blades $e^3$ radially disposed to said shaft. It is evident, of course, that any form of device may be employed for stirring or agitating the cement powder as it comes from the cement-receptacle E into the floating mass or cloud.

It will be noted that the bottom portion of the cement-receptacle and the receptacle D for the inert material are of a combined size to substantially coincide with an opening $C^2$ in the casing C, so that when said casing is moved by the handle C′ into position shown in Fig. 2 the opening $C^2$ therein will communicate with both the openings of the cement-receptacle and the inert-material receptacle.

The shaft B, carrying the blades or stirrers $b$, has a sprocket-wheel $b^2$ provided thereon, which may be driven from any suitable source of power by a suitable belt or sprocket, (shown at $b^3$.) The shaft B on the end opposite the sprocket-wheel $b^2$ is provided with a pulley $b^4$, about which passes a belt $b^5$ for driving the idle pulley $b^6$ through the small pulley $b^7$, as best illustrated in Fig. 1. The cement-agitator $e'$ is driven from the pulley $b^6$ by means of a belt $b^8$, engaging the pulley $b^6$ and a small pulley $b^4$, on the end of the shaft $e^2$ of the cement-agitator. While I have described the particular means for driving the blades or stirrers $b$ and the cement-agitator, it will of course be understood that any suitable devices may be employed.

Disposed in suitable relation to the top of the inert-material receptacle D is a water-pipe F, communicating by a suitable supply-pipe $f$ to a convenient source of supply, and said water-pipe F is provided with a series of holes or perforations to properly wet the material that may be contained in the receptacle D.

Extending from the receptacles D and E circumferentially with respect to the casing C are the circular projecting flanges G G′. When the casing C is turned about its supports to bring the openings $C^2$ below the shaft B to discharge the contents of the casing, the opening $C^2$ travels over the circular projecting flange G, which acts as a retainer for the material in the casing until the opening of the casing is brought to the discharge-point, as will be obvious. Likewise when the casing is rotated in the opposite direction to bring the opening $C^2$ beneath the circular projecting flange G′ at the time when the receptacles D and E are being charged with the desired quantities of inert and active materials, respectively, the portion of the casing below the opening $C^2$ may form a closure for the bottom of the receptacles D and E, as will be apparent.

Many forms of machines or mechanical devices might be suggested for carrying out the present method, the essentials of which comprise the formation of a cloud or floating mass of dry cement powder and moving into or through such floating mass or cloud of cement powder the particles of the inert mass which have been previously wet, so that by coming in contact with the dry floating particles of cement powder each of the particles of the inert mass will have attached to its surfaces the particles of dry powder, which uniting with the moisture on the particles of the inert mass will form a paste and completely cover the same.

Referring to the operation of the device which has been illustrated as one of the many forms of mechanisms that may be employed in carrying out the present method, the casing C is first turned by means of a handle C′ to bring the openings $C^2$ thereof beneath the casing G′. The receptacles D and E are then filled, respectively, the one with the inert material, such as sand and broken stone or gravel, and the other with the dry cement powder. The casing C is then turned to bring the opening $C^2$ into coincidence with the openings of the receptacles D and E. The sliding doors $e$ are then withdrawn to a suitable extent. The shaft B and stirrers or blades $b$ are rotated within the casing, and simultaneously the cement-agitator $e'$ is rotated, so that as the inert material in the receptacle D which has been previously wet from the water-pipe F passes into the casing C it comes in contact with the floating particles or cloud of cement powder produced by the cement-agitator as the cement passes from the receptacle E into the casing C. The wet particles of the inert material become coated and covered with the particles of the cement powder as they pass in contact therewith. After the inert material has been entirely discharged into the casing C it may be continued in agitation for a time, so as to insure the intimate contact of all the particles of the inert material with the cloud or floating particles of cement powder within the casing C. The casing may then be rotated to bring the opening $C^2$ at a point below the shaft B to discharge the mixture, which will be found to be a homogeneous mass, each particle of which is thoroughly covered by cement paste.

It will be evident, of course, that the inert material may be supplied with the requisite amount of moisture either entirely before it enters the casing C or only partially, and the remaining moisture may be added during the action of the stirrers $b$, the essential in this respect being that the particles of inert material be provided with a surface moisture to which the dry cement powder may adhere and form cement paste.

Having thus described my invention, what I claim as new, and desire to secure by Letters Patent, is—

1. The improved method of mixing concrete which consists in wetting the inert material and then subjecting the wet inert material to the action of a cloud of dry powder cement to cause the particles of inert material to become covered with cement paste.

2. The improved method of mixing concrete which consists in wetting the inert material and moving the wet inert material in a cloud of dry powder cement to cause the particles of inert material to become covered with cement paste.

3. The method of mixing concrete which consists in forming a cloud of powder cement, wetting the inert material, and moving the wet inert material in the cloud of dry powder cement to cause the particles of inert material to become covered with cement paste.

4. The method of mixing concrete which consists in forming a cloud of dry powder cement, and agitating a mass of wet inert material in said cloud of dry powder cement to cause the particles of wet inert material to become covered with cement paste.

5. The method of mixing concrete which consists in wetting the inert material, moving the wet inert material and simultaneously forcing a cloud of dry powder cement across the path of movement of the wet inert material to cause the particles of inert material to become covered with cement paste.

In testimony whereof I affix my signature in presence of two witnesses.

PETER C. HAINS.

Witnesses:
 W. S. BABCOCK,
 EDWIN S. CLARKSON